(12) United States Patent
Yamamoto

(10) Patent No.: US 10,976,970 B2
(45) Date of Patent: Apr. 13, 2021

(54) IMAGE FORMING APPARATUS WITH AN IMPROVED IMAGE CENTERING POSITIONING SYSTEM

(71) Applicant: KYOCERA Document Solutions Inc., Osaka (JP)

(72) Inventor: Takenori Yamamoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/694,521

(22) Filed: Nov. 25, 2019

(65) Prior Publication Data

US 2020/0167101 A1 May 28, 2020

(30) Foreign Application Priority Data

Nov. 27, 2018 (JP) ................. 2018-221747

(51) Int. Cl.
*G06F 3/12* (2006.01)
*G06T 3/20* (2006.01)
*B65H 43/04* (2006.01)
*B65H 7/08* (2006.01)

(52) U.S. Cl.
CPC ............ *G06F 3/1208* (2013.01); *B65H 7/08* (2013.01); *B65H 43/04* (2013.01); *G06T 3/20* (2013.01)

(58) Field of Classification Search
CPC ........... G06F 3/1208; G06F 3/12; G06T 3/20; B65H 43/04; B65H 7/08; B41J 11/008
See application file for complete search history.

(56) References Cited

U.S. PATENT DOCUMENTS

2007/0216718 A1* 9/2007 Mizuno ................. B41J 11/008
347/16
2012/0104689 A1* 5/2012 Tamada ................. B65H 31/18
271/220

FOREIGN PATENT DOCUMENTS

JP H05-313447 11/1993
JP 2014-139110 7/2014

* cited by examiner

*Primary Examiner* — Juan M Guillermety

(57) ABSTRACT

An image forming apparatus includes a print engine, a sheet transportation unit, a line sensor, and a control unit. The print engine is configured to physically print an image to be printed on a print sheet. The sheet transportation unit is configured to transport the print sheet. The line sensor is arranged along a direction perpendicular to a transportation direction of the print sheet, and configured to detect positions of both end edges of the print sheet. The control unit is configured to (a) determine as a sheet center actual position a center position of the print sheet on the basis of the detected positions of both end edges of the print sheet, and (b) adjust a center position of the image to be printed so as to cause the center position of the image to be printed to agree with the sheet center actual position.

6 Claims, 6 Drawing Sheets

FIG. 6

| STATUS | SHEET CENTER ACTUAL POSITION (PIXEL) | SHEET CENTER DEVIATION AMOUNT (PIXEL) | SHEET CENTER ACTUAL POSITION DATA | | | SHEET CENTER EXPECTATION POSITION (PIXEL) |
|---|---|---|---|---|---|---|
| | | | [0] | [1] | [2] | |
| INITIAL STATUS (AT PRINTING START TIME POINT) | | | 3570 | 3570 | 3570 | 3570 |
| 1ST PAGE | 3500 | 70 | 3500 | 3570 | 3570 | 3547 |
| 2ND PAGE | 3470 | 77 | 3500 | 3470 | 3570 | 3513 |
| 3RD PAGE | 3480 | 33 | 3500 | 3470 | 3480 | 3483 |
| 4TH PAGE | 3450 | 33 | 3450 | 3470 | 3480 | 3467 |
| ... | | | | | | |

IMAGE FORMING APPARATUS WITH AN IMPROVED IMAGE CENTERING POSITIONING SYSTEM

CROSS-REFERENCE TO RELATED APPLICATIONS

This application relates to and claims priority rights from Japanese Patent Application No. 2018-221747, filed on Nov. 27, 2018, the entire disclosures of which are hereby incorporated by reference herein.

BACKGROUND

1. Field of the Present Disclosure

The present disclosure relates to an image forming apparatus.

2. Description of the Related Art

An image forming apparatus (hereinafter, called first image forming apparatus) detects a center of a print sheet using a line sensor, determines a deviation between the center of the print sheet and a center of an image to be printed to the print sheet, and moves a transportation roller along a width direction of the print sheet while the transportation roller nips the print sheet and thereby reduces the deviation.

An image forming apparatus (hereinafter, called second image forming apparatus) includes plural sheet feeding trays, memorizes fixed center position deviation amounts corresponding to the plural sheet feeding trays, and mechanically adjusts an optical system for an electrophotographic process and thereby moves an image formed in an electrophotographic process by the center position deviation amount corresponding to the sheet feeding tray in use.

The first image forming apparatus can reduce a deviation of the center position on the basis of a center position of a print sheet in transportation, but requires a mechanism to mechanically move the transportation roller and consequently results in a high cost of the apparatus.

Further, the second image forming apparatus mechanically corrects a center position of an image to be formed in an electrophotographic process on the basis of the fixed center position deviation amount, and consequently results in a high cost of the apparatus as well, and in addition, it does not effectively reduce a deviation of the center position because it does not take fluctuation of the center position sheet by sheet into account.

SUMMARY

An image forming apparatus according to an aspect of the present disclosure includes a print engine, a sheet transportation unit, a line sensor, and a control unit. The print engine is configured to physically print an image to be printed on a print sheet. The sheet transportation unit is configured to transport the print sheet. The line sensor is arranged along a direction perpendicular to a transportation direction of the print sheet, and configured to detect positions of both end edges of the print sheet. The control unit is configured to (a) determine as a sheet center actual position a center position of the print sheet on the basis of the detected positions of both end edges of the print sheet, and (b) adjust a center position of the image to be printed so as to cause the center position of the image to be printed to agree with the sheet center actual position.

These and other objects, features and advantages of the present disclosure will become more apparent upon reading of the following detailed description along with the accompanied drawings.

BRIEF DESCRIPTION OF THE DRAWINGS

FIG. 6 shows a diagram that indicates an example of transition of the sheet center actual position, the center position deviation amount, sheet center actual position data, and the sheet center expectation position in continuous printing in Embodiment 2.

DETAILED DESCRIPTION

Hereinafter, embodiments according to an aspect of the present disclosure will be explained with reference to drawings.

Embodiment 1

Figure 1:
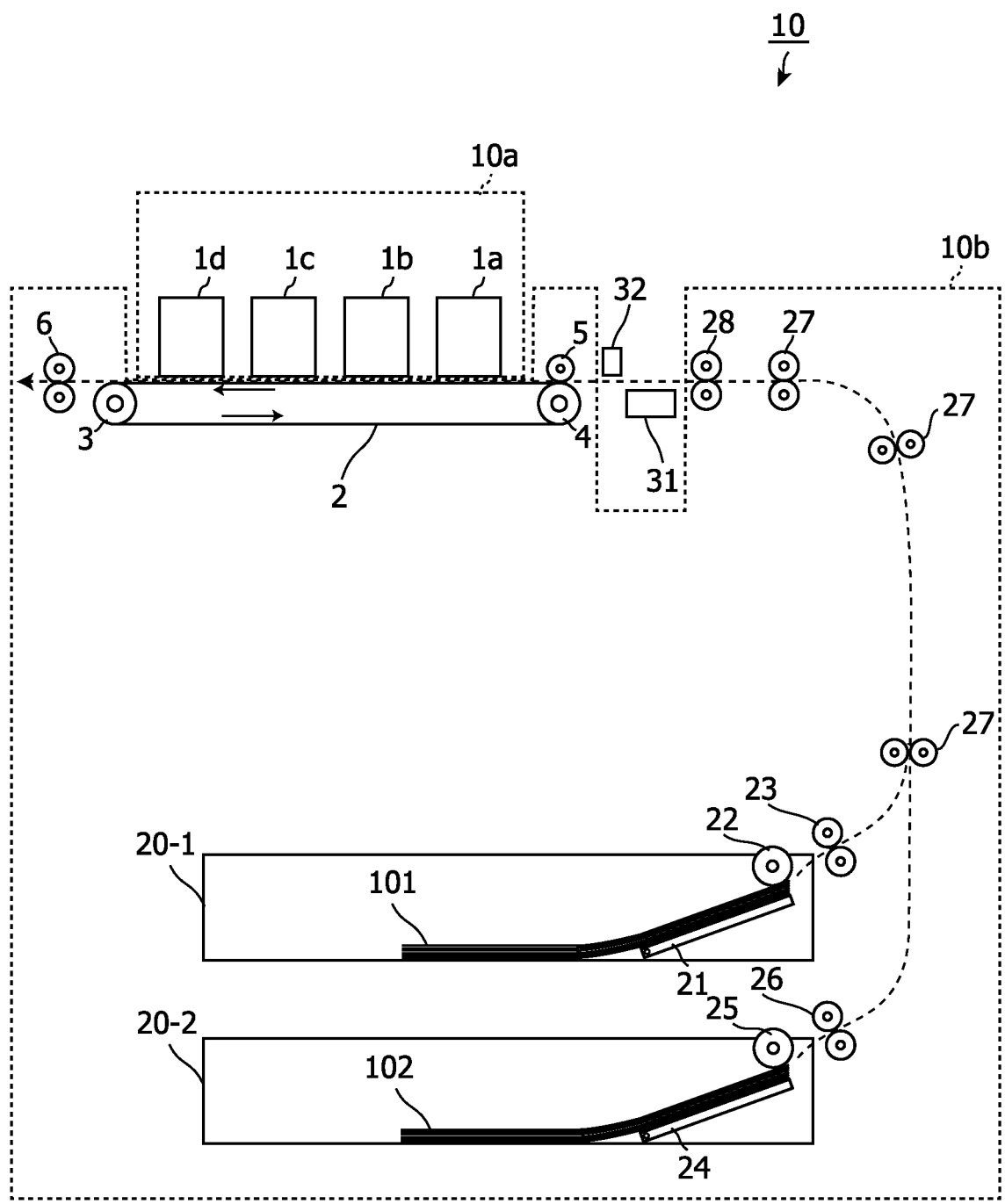
FIG. 1 shows a side view that indicates an internal mechanical configuration of an image forming apparatus in an embodiment according to the present disclosure.
Figure 2:
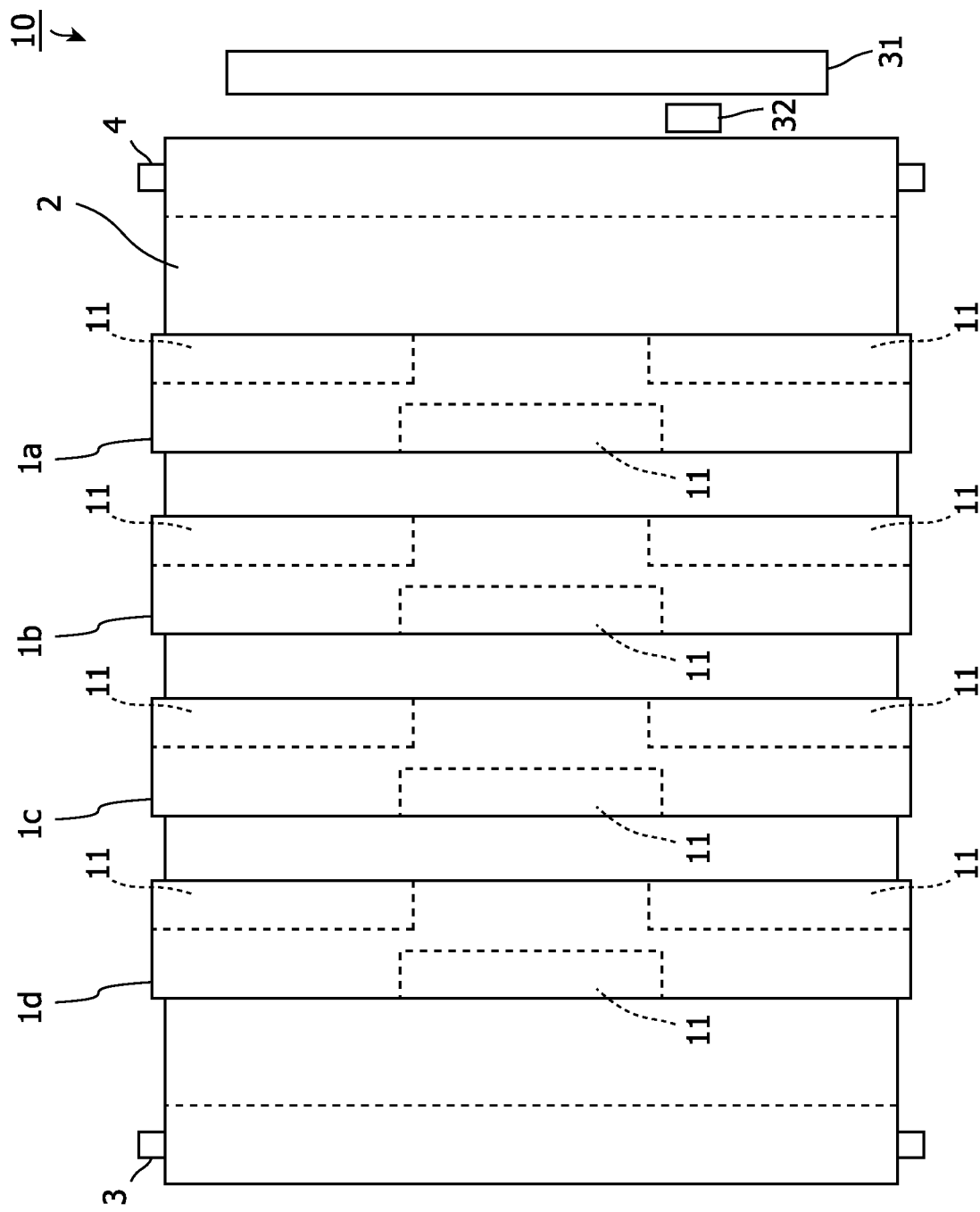
FIG. 2 shows a plane view of the image forming apparatus shown in FIG. 1.

FIG. 1 shows a side view that indicates an internal mechanical configuration of an image forming apparatus in an embodiment according to the present disclosure. FIG. 2 shows a plane view of the image forming apparatus shown in FIG. 1.

The image forming apparatus 10 in this embodiment is an apparatus such as printer, copier, facsimile machine or multi function peripheral, and has an inkjet-type color printing mechanism, here a line-type inkjet printing mechanism.

The image forming apparatus 10 includes a print engine 10a and a sheet transportation unit 10b. The print engine 10a physically prints an image to be printed on a print sheet (print paper sheet or the like). The sheet transportation unit 10b transports the print sheet to the print engine 10a.

In this embodiment, the print engine 10a includes line-type inkjet recording units 1a to 1d corresponding to four ink colors: Cyan, Magenta, Yellow, and Black.

As shown in FIG. 2, in this embodiment, each inkjet recording unit 1a, 1b, 1c or 1d includes plural (here, three) head units 11. The head units 11 are arranged along a primary scanning direction, and are capable of being mounted to and demounted from a main body of the image forming apparatus. Each inkjet recording unit 1a, 1b, 1c or 1d may include only one head unit 11.

Further, in this embodiment, the sheet transportation unit 10b includes (a) a circular-type transportation belt 2, arranged so as to face the print engine 10a, that transports a print sheet, (c) a driving roller 3 and a driven roller 4 around which the transportation belt 2 is hitched, (d) a nipping roller 5 that nips the printing paper sheet with the transportation belt 2, and (e) an output roller pair 6.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1a to 1d in turn, and on the print sheet, images of respective colors are printed by the inkjet recording units 1a to 1d. Subsequently, after the color printing, the print sheet is outputted by the output roller pair 6 to an output tray (not shown) or the like.

Further, the sheet transportation unit 10b includes plural sheet feeding cassettes 20-1 and 20-2. The sheet feeding cassettes 20-1 and 20-2 store print sheets 101 and 102, and push up the print sheets 101 and 102 using lift plates 21 and 24 so as to cause the print sheets 101 and 102 to contact with pickup rollers 22 and 25, respectively. The print sheets 101 and 102 put on the sheet feeding cassettes 20-1 and 20-2 are picked up to sheet feeding rollers 23 and 26 by the pickup rollers 22 and 25 sheet by sheet from the upper side, respectively. The sheet feeding rollers 23 and 26 are rollers that transport the print sheets 101 and 102 sheet by sheet fed by the pickup rollers 22 and 25 from the sheet feeding cassettes 20-1 and 20-2 onto a transportation path.

A transportation roller 27 is a transportation roller on the transportation path common to the print sheets 101 and 102 transported from the sheet feeding cassettes 20-1 and 20-2.

The registration roller 28 temporarily stops the incoming print sheet 101 or 102 in transportation, and transports this print sheet 101 or 102 to the print engine 10a at a secondary sheet feeding timing. The secondary sheet feeding timing is instructed by a control unit 81 mentioned below such that an image is formed at a specified position on the print sheet 101 or 102.

In this embodiment, when the print sheet 101 or 102 reaches the registration roller 28, the transportation roller 27 previous to the registration roller 28 adjusts a transportation time length of the print sheet 101 or 102 and thereby creates flexure of the print sheet 101 or 102, and consequently restrains skew (i.e. oblique motion) of the print sheet 101 or 102.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges of the print sheet. For example, the line sensor 31 is a CIS (Contact Image Sensor). In this embodiment, the line sensor 31 is arranged at a position on the transportation path of the print sheet between the registration roller 28 and the print engine 10a.

The sheet detecting sensor 32 is an optical sensor that detects that a top end of the print sheet 101 or 102 passes through a predetermined position on the transportation path.

Figure 3:
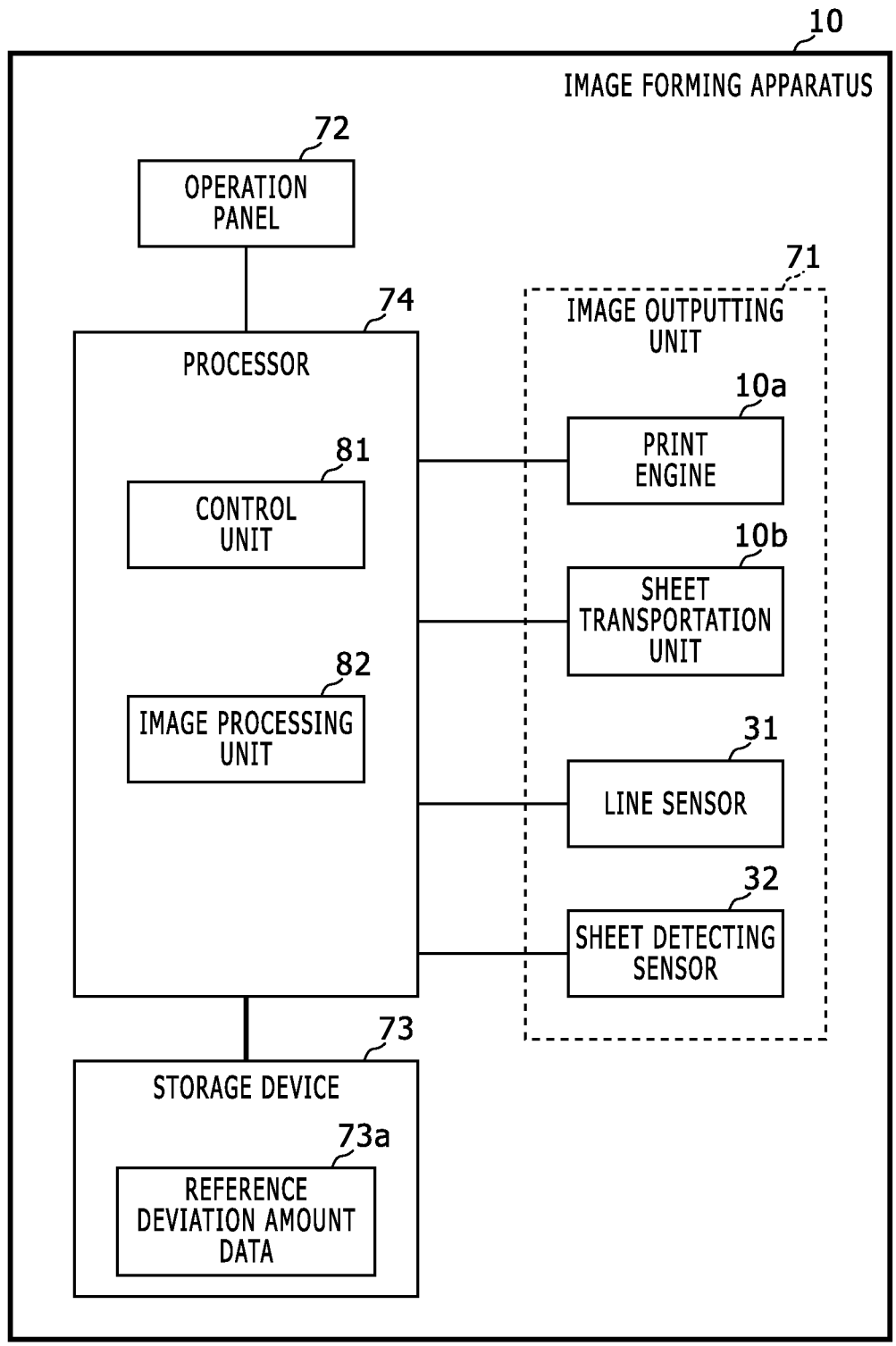
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure.

As shown in FIG. 3, the image forming apparatus 10 includes not only an image outputting unit 71 that includes the mechanical configuration shown in FIGS. 1 and 2 but an operation panel 72, a processor 73, and a processor 74. The image outputting unit 71 includes the aforementioned line sensor 31 and the aforementioned sheet detecting sensor 32.

The operation panel 72 is arranged on a housing surface of the image forming apparatus 10, and includes a display device such as a liquid crystal display and an input device such as a hard key and/or touch panel, and displays sorts of messages for a user using the display device and receives a user operation using the input device.

The storage device 73 is a non-volatile storage device (flash memory, hard disk drive or the like) in which data, a program and the like required for control of the image forming apparatus 10 have been stored. In the storage device 72, reference deviation amount data 73a mentioned below has been stored.

The processor 74 includes a computer that acts in accordance with a program, an ASIC (Application Specific Integrated Circuit) that performs a predetermined action, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required).

Here the processor 74 acts as a control unit 81 and an image processing unit 82.

The control unit 81 controls the image outputting unit 71 and thereby performs a print job requested by a user. In this embodiment, the control unit 81 causes the image processing unit 82 to perform a predetermined image process, and controls the head units 11 and causes the head units 11 to eject ink and thereby forms a printing image on a print sheet. The image processing unit 82 performs a predetermined image process such as a RIP (Raster Image Processing), a color conversion, halftoning and/or the like for image data of a printing image.

In particular, the control unit 81 (a) determines as a sheet center actual position a center position of the print sheet 101 or 102 on the basis of the detected positions of both end edges of the print sheet 101 or 102, and (b) adjusts a center position of the image to be printed so as to cause the center position of the image to be printed to agree with the sheet center actual position.

Specifically, the control unit 81 causes the print engine 10a to print the image to be printed so as to move this image in a primary scanning direction by a difference between the sheet center actual position and a reference value of a center position of an image to be printed.

Here, the reference value of a center position of an image to be printed is set as a center position of the line sensor 31 and the inkjet recording units 1a to 1d.

In this embodiment, the control unit 81 determines the center position of the print sheet 101 or 102 (i.e. the sheet center actual position) on the basis of positions of the both end edges detected by the line sensor 31 at a time point that a top end of the print sheet in transportation is detected by the sheet detecting sensor 32. Consequently, the sheet center actual position is measured at a constant position in the print sheet 101 or 102. Therefore, even if plural print sheets 101 or 102 in series are obliquely transported, the sheet center actual positions of the plural print sheets 101 or 102 are measured in the same condition.

The aforementioned reference deviation amount data 73a indicates a reference deviation amount of a center position of the print sheet 101 or 102. The control unit 81 reads the reference deviation amount data 73a; (a) determines as a center position deviation amount a distance between the sheet center actual position and a sheet center expectation position of the print sheet 101 or 102 based on the reference deviation amount; (b) determines whether the center position deviation amount exceeds a predetermined threshold value or not; and (c) if the center position deviation amount exceeds the threshold value, determines that a centering error occurs, and otherwise if not, does not determine that a centering error occurs.

Figure 4:
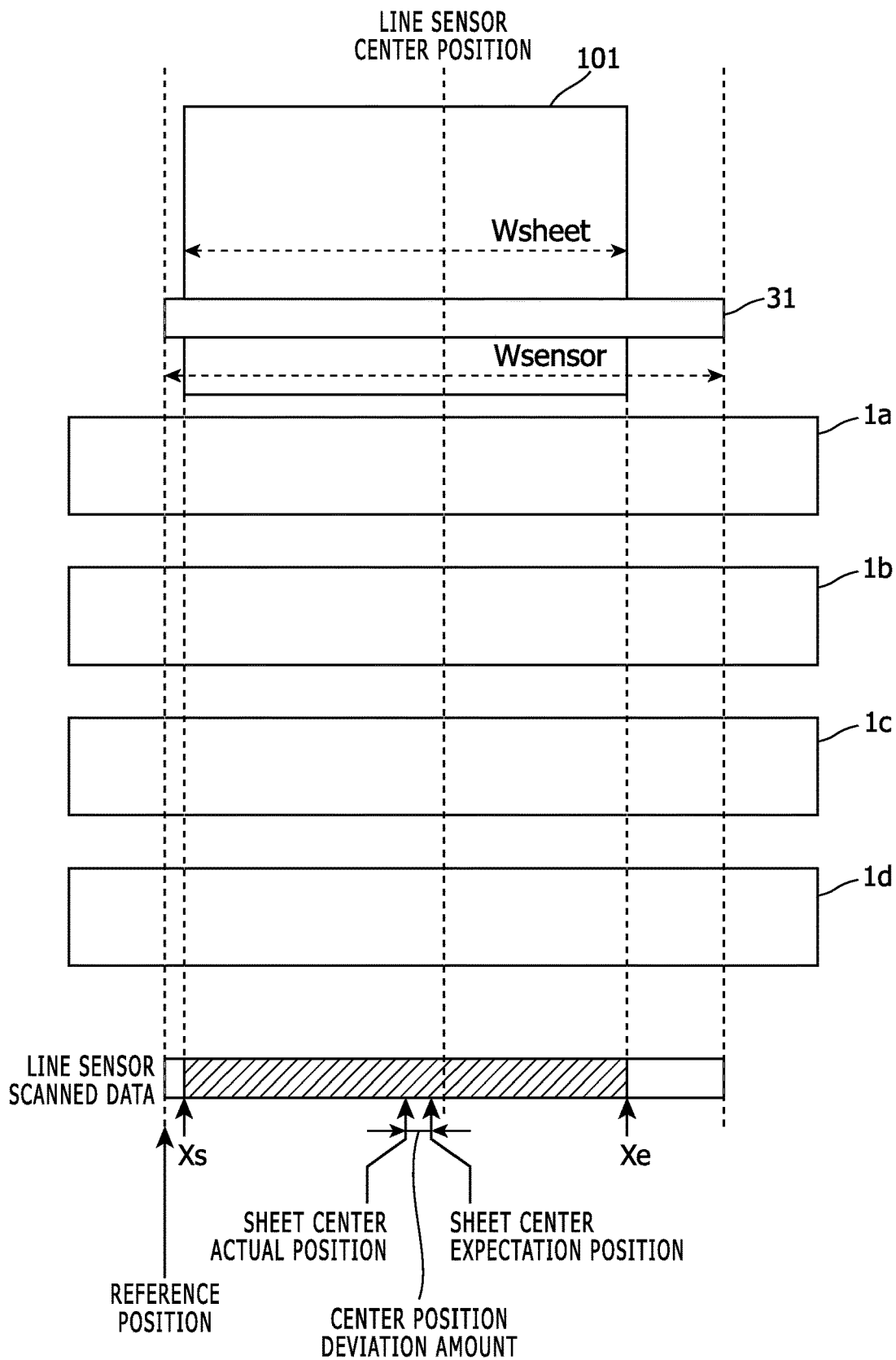
FIG. 4 shows a diagram that explains a sheet center actual position, a sheet center expectation position, and a center position deviation amount of the image forming apparatus in Embodiment 1.

FIG. 4 shows a diagram that explains a sheet center actual position, a sheet center expectation position, and a center position deviation amount of the image forming apparatus in Embodiment 1.

As shown in FIG. 4, in scanned data of the line sensor 31, pixels in a section of a width Wsheet of the print sheet 101 or 102 have pixel values corresponding to a color of the print sheet 101 or 102, and the other pixels have pixel values corresponding to a background color, and therefore, edges appear in an image at pixel positions Xs and Xe corresponding to (physical) both end edges of the print sheet 101 or 102. The control unit 81 detects these edges in an image detected by the line sensor, and derives a sheet center actual position P1 in accordance with the following formula. It should be noted that a pixel position of a pixel is expressed as a number of pixels from a reference position to this pixel, where the reference position is set as an end of the line sensor 31.

$$P1=(Xe-Xs)/2$$

For example, a sheet center expectation position P2 is determined as a position obtained by adding the reference deviation amount to a center pixel position of the line sensor 31. Here, assuming a width of the line sensor 31 as Wsensor and the reference deviation amount as dx, the sheet center expectation position P2 is derived in accordance with the following formula.

$$P2=(W\text{sensor}/2)+dx$$

It should be noted that if the reference deviation amount dx is a deviation amount directed toward the reference position, the reference deviation amount dx takes a negative value; and if the reference deviation amount dx is a deviation amount directed away from the reference position, the reference deviation amount dx takes a positive value.

Further, the center position deviation amount dp is derived as a difference between the sheet center expectation position and the sheet center actual position (i.e. dp=P2−P1 or dp=P1−P2).

In this embodiment, the reference deviation amount data 73a indicates respective reference deviation amounts of the plural sheet feeding cassettes 20-1 and 20-2, and the control unit 81 determines as the center position deviation amount a distance between the sheet center actual position and a sheet center expectation position based on the reference deviation amount of the sheet feeding cassette 20-$i$ ($i$=1 or 2) that the paper sheet 101 or 102 had been stored.

The following part explains a behavior of the image forming apparatus in Embodiment 1.

(a) Center Position Correction when Printing

When performing a print job, the control unit 81 causes the image processing unit 82 to perform a predetermined image process and causes the sheet transportation unit 10b to transport a print sheet 101 or 102 to the registration roller 28.

Subsequently, the control unit 81 measures a sheet center actual position of the print sheet 101 or 102 using the line sensor 31 at a position on the transportation path from the registration roller 28 to the print engine 10a, derives a difference between the sheet center actual position and the reference value of a center position of an image, and causes the print engine 10a to perform printing so as to move the image by this difference.

Consequently, the image is printed at a center in a width direction of the print sheet 101 or 102.

(b) Detection of a Centering Error

On the other hand, the control unit 81 reads the reference deviation amount data 73a and derives a sheet center expectation position based on the reference deviation amount, until the print sheet 101 or 102 is transported to the registration roller 28, and as mentioned, upon measuring the sheet center actual position, derives a center position deviation amount, and determines whether a centering error occurs or not on the basis of the derived center position deviation amount.

If it is determined that a centering error does not occur, then the control unit 81 continues the printing; and if it is determined that a centering error occurs, then the control unit 81 cancels the printing and displays an error message on the operation panel 72.

As mentioned, in Embodiment 1, the print engine 10a physically prints an image to be printed on a print sheet 101 or 102, and the sheet transportation unit 10b transports the print sheet 101 or 102. The line sensor 31 is arranged along a direction perpendicular to a transportation direction of the print sheet 101 or 102, and detects positions of both end edges (i.e. side edges) of the print sheet 101 or 102. The control unit 81 (a) determines as a sheet center actual position a center position of the print sheet 101 or 102 on the basis of the detected positions of both end edges of the print sheet 101 or 102, and (b) adjusts a center position of the image to be printed so as to cause the center position of the image to be printed to agree with the sheet center actual position.

Consequently, a deviation between a center position of the print sheet 101 or 102 and a center position of an image to be formed on the print sheet 101 or 102 is effectively reduced with a relatively low cost.

Embodiment 2

In Embodiment 2, in order to detect a centering error, the image forming apparatus renews the sheet center expectation position on the basis of a sheet center actual position obtained on each page (i.e. sheet by sheet) in continuous printing. The continuous printing is printing of a plural-page document, printing of plural copies of a document.

In Embodiment 2, the control unit 81 saves sheet center actual position data that indicates sheet center actual positions detected of a predetermined number N of latest print sheets.

Here, the sheet center actual position data is array data of the aforementioned predetermined number N of integer values, and acts as a ring buffer. For example, the sheet center actual position data is stored in the aforementioned RAM in the processor 74.

In Embodiment 2, the control unit 81 (a) sets all initial values of the N sheet center actual positions in the sheet center actual position data as the reference deviation amount, (b) renews one sheet center actual position in the sheet center actual position data with the sheet center actual position of each print sheet in continuous printing, and (c) sets an average of the predetermined number N of the sheet center actual positions in the sheet center actual position data to the sheet center expectation position.

Therefore, in Embodiment 2, the initial value of the sheet center expectation position is set on the basis of the reference deviation amount, and afterward, page by page (i.e. sheet by sheet), the sheet center expectation position is renewed on the basis of the sheet center actual position, with the initial value as a starting point.

Further, when the continuous printing is resumed after stopped, the control unit 81 resets all the N sheet center actual positions in the sheet center actual position data to be the reference deviation amount. Thus, when the continuous printing is stopped, replenishment of print sheets to the sheet feeding cassette 20-$i$, or the like may be performed and consequently a status of a deviation of the center position may be changed, and therefore the sheet center actual position data is initialized.

Other parts of the configuration of the image forming apparatus in Embodiment 2 are identical or similar to those in Embodiment 1, and therefore not explained here.

Figure 5:
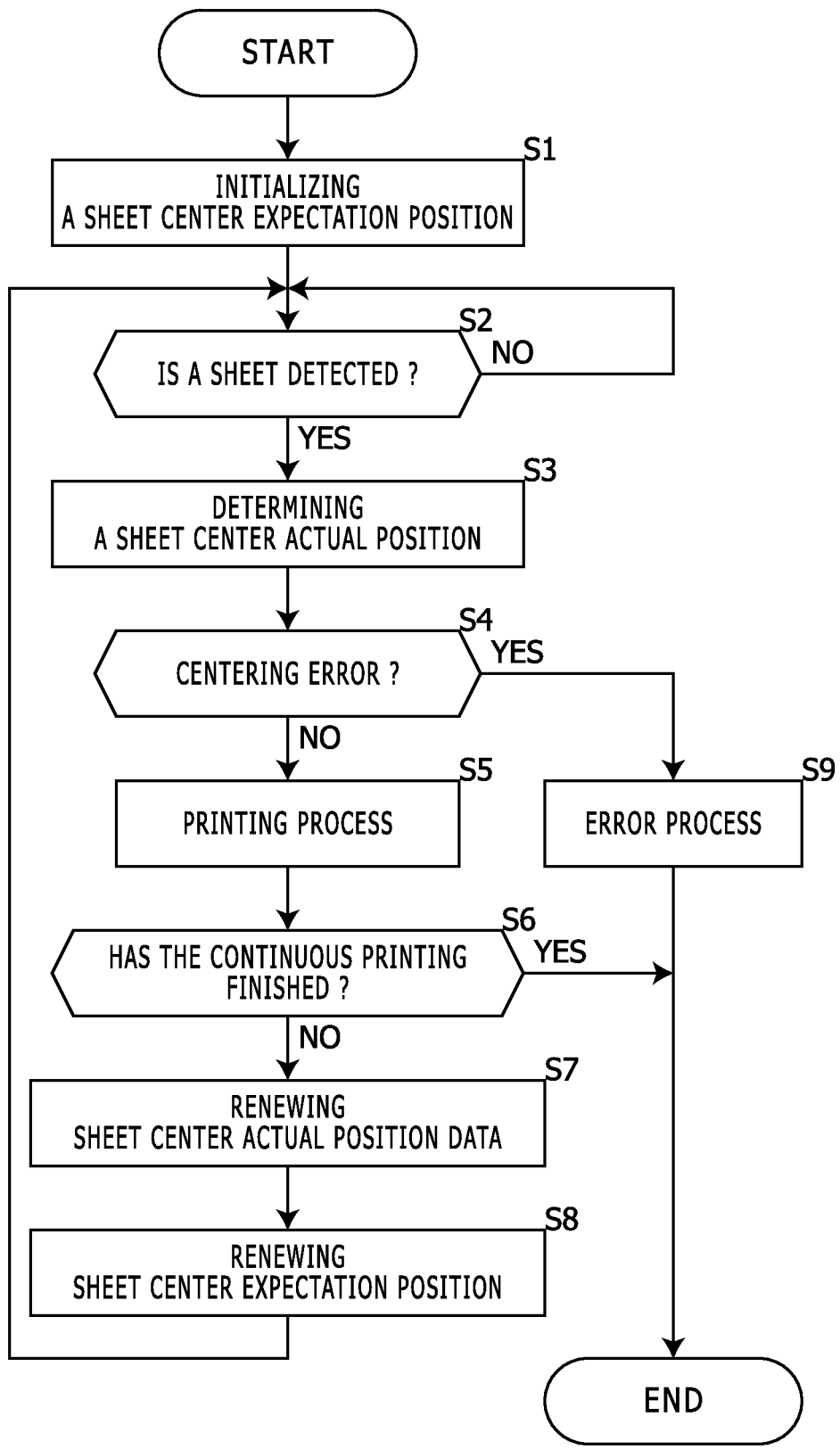
FIG. 5 shows a flowchart that shows a behavior of the image forming apparatus in Embodiment 2.

The following part explains a behavior of the image forming apparatus in Embodiment 2. FIG. 5 shows a flowchart that shows a behavior of the image forming apparatus in Embodiment 2.

When performing continuous printing, the image forming apparatus in Embodiment 2 performs detection of a centering error in the following manner.

Firstly, the control unit 81 reads the reference deviation amount data 73$a$, and sets a reference deviation amount as an initial value to the 0-th to (N−1)-th elements in the sheet center actual position data (array data) (in Step S1). Here, N is the aforementioned predetermined number.

Subsequently, upon detecting a print sheet by the sheet detecting sensor 32 (in Step S2), the control unit 81 determines a sheet center actual position of this print sheet using the line sensor 31 (in Step S3), derives a difference between the sheet center actual position and the current sheet center expectation position (i.e. derives a center position deviation amount), and determines whether the center position deviation amount exceeds a predetermined threshold value or not (i.e. determines whether a centering error occurs or not) (in Step S4).

If a centering error does not occur currently, then the control unit 81 continues the printing process and finishes the printing of this print sheet.

Here, the control unit 81 determines whether the continuous printing has been finished or not (in Step S6); and if the continuous printing has not been finished yet, the control unit 81 renews a value of one element in the sheet center actual position data with the sheet center actual position of this print sheet (in Step S7).

For example, regarding the sheet center actual position of the $i$-th page, a remainder $j$ is derived when dividing ($i$−1) by N, and a value of the $j$-th element is renewed with the sheet center actual position of the $i$-th page.

Therefore, the oldest element value in the sheet center actual position data is renewed. In this manner, sheet center actual positions of the latest predetermined number N of print sheets are maintained in the sheet center actual position data.

Subsequently, the control unit 81 derives an average value of the sheet center actual positions of the latest N print sheets on the basis of the renewed sheet center actual position data, and renews the sheet center expectation position with this average value (in Step S8).

Afterward, returning to Step S2, the control unit 81 performs the aforementioned process as well for the next print sheet.

Contrarily, if in Step S4 it is determined that a centering error occurs, then the control unit 81 performs an error process such as displaying of an error message and/or the like (in Step S9), and terminates this process.

Further, if in Step S6 the continuous printing has been finished, the control unit 81 terminates this process.

The next part explains a specific example.

FIG. 6 shows a diagram that indicates an example of transition of the sheet center actual position, the center position deviation amount, sheet center actual position data, and the sheet center expectation position in continuous printing in Embodiment 2. FIG. 6 shows an example in which Wsensor is 7,200 pixels, and the reference deviation amount is −30 pixels, and the aforementioned predetermined number N is 3.

Firstly, in the initial status, the sheet center expectation position is calculated as 3,570 (=(7,200/2)+(−30)), and is set to the 0-th to 2nd elements in the sheet center actual position data.

Subsequently, when the sheet center actual position of the 1st page of a print sheet is measured as 3,500 pixels, the difference (70 pixels) between the current sheet center expectation position (3,570 pixels) and the sheet center actual position (3,500 pixels) of the 1st page is calculated as the center position deviation amount, and it is determined whether a centering error occurs or not on the basis of this center position deviation amount.

Further, a value of the 0-th element in the sheet center actual position data is renewed with this sheet center actual position (3,500 pixels) of the 1st page, and consequently, the sheet center expectation position is renewed to 3,547.

In the same manner, when the sheet center actual position of the 2nd page of a print sheet is measured as 3,470 pixels, the difference (77 pixels) between the current sheet center expectation position (3,547 pixels) and the sheet center actual position (3,470 pixels) of the 2nd page is calculated as the center position deviation amount, and it is determined whether a centering error occurs or not on the basis of this center position deviation amount.

Further, a value of the 1st element in the sheet center actual position data is renewed with this sheet center actual position (3,470 pixels) of the 2nd page, and consequently, the sheet center expectation position is renewed to 3,513.

In the same manner, when the sheet center actual position of the 3rd page of a print sheet is measured as 3,480 pixels, the difference (33 pixels) between the current sheet center expectation position (3,513 pixels) and the sheet center actual position (3,480 pixels) of the 3rd page is calculated as the center position deviation amount, and it is determined whether a centering error occurs or not on the basis of this center position deviation amount.

Further, a value of the 2nd element in the sheet center actual position data is renewed with this sheet center actual position (3,480 pixels) of the 3rd page, and consequently, the sheet center expectation position is renewed to 3,483.

In the same manner, when the sheet center actual position of the 4th page of a print sheet is measured as 3,450 pixels, the difference (33 pixels) between the current sheet center expectation position (3,483 pixels) and the sheet center actual position (3,450 pixels) of the 4th page is calculated as the center position deviation amount, and it is determined whether a centering error occurs or not on the basis of this center position deviation amount.

Further, a value of the 3rd element in the sheet center actual position data is renewed with this sheet center actual position (3,450 pixels) of the 4th page, and consequently, the sheet center expectation position is renewed to 3,467.

Afterward, until the continuous printing is stopped or terminated, the sheet center expectation position is renewed page by page as well, and the detection of a centering error is tried on the basis of the current sheet center expectation position at each time point.

Other parts of the behaviors of the image forming apparatus in Embodiment 2 are identical or similar to those in Embodiment 1, and therefore not explained here.

As mentioned, in Embodiment 2, the control unit 81 (a) sets all initial values of the sheet center actual positions in the sheet center actual position data as the reference deviation amount, (b) renews one sheet center actual position in the sheet center actual position data with the sheet center actual position of each print sheet in continuous printing, and (c) sets an average of the predetermined number of the sheet center actual positions in the sheet center actual position data to the sheet center expectation position.

Consequently, in continuous printing, if center positions of print sheets are continuously deviated toward a positive direction or a negative direction, then the sheet center expectation position is gradually changed in such direction, and consequently, compared with Embodiment 1, improper detection of a centering error is restrained.

Center positions of print sheets may be continuously deviated toward a positive direction or a negative direction due to a position of a bunch of print sheets 101 or 102 stored in the sheet feeding cassette 20-i. In such a case, if the sheet center expectation position is fixed, an allowable range of fluctuation of center positions of print sheets gets narrow against a threshold value of a centering error, and consequently, a centering error may be improperly detected even though a current status of the apparatus should not be detected as a centering error. Contrarily, as mentioned, in Embodiment 2, the sheet center expectation position is changed with taking the sheet center actual position into account, and consequently, such allowable range is sufficiently obtained and improper detection of a centering error is restrained.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in Embodiment 1 or 2, the print engine 10a is an inkjet-type print engine, and alternatively, the print engine 10a may be another-type print engine such as electrophotographic type.

Further, in Embodiment 1 or 2, two sheet feeding cassettes 20-1 and 20-2 are installed, and one or three or more may be installed.

What is claimed is:

1. An image forming apparatus, comprising:
   a print engine configured to physically print an image to be printed on a print sheet;
   a sheet transportation unit configured to transport the print sheet;
   a line sensor arranged along a direction perpendicular to a transportation direction of the print sheet, and configured to detect positions of both end edges of the print sheet;
   a control unit configured to (a) determine as a sheet center actual position a center position of the print sheet on the basis of the detected positions of both end edges of the print sheet, and (b) adjust a center position of the image to be printed so as to cause the center position of the image to be printed to agree with the sheet center actual position;
   a storage device in which reference deviation amount data has been stored, the reference deviation amount data indicating a reference deviation amount of a center position of the print sheet; and
   wherein the control unit (a) determines as a center position deviation amount a distance between the sheet center actual position and a sheet center expectation position of the print sheet based on the reference deviation amount, (b) determines whether the center position deviation amount exceeds a predetermined threshold value or not, and (c) if the center position deviation amount exceeds the threshold value, determines that an error occurs.

2. The image forming apparatus according to claim 1, wherein the sheet transportation unit comprises a registration roller; and
   the line sensor is arranged at a position on a transportation path of the print sheet between the registration roller and the print engine.

3. The image forming apparatus according to claim 1, further comprising a sheet detecting sensor;
   wherein the control unit determines the center position of the print sheet on the basis of positions of the both end edges detected at a time point that a top end of the print sheet in transportation is detected by the sheet detecting sensor.

4. The image forming apparatus according to claim 1, further comprising plural sheet feeding cassettes;
   wherein the reference deviation amount data indicates respective reference deviation amounts of the plural sheet feeding cassettes; and
   the control unit determines as the center position deviation amount a distance between the sheet center actual position and a sheet center expectation position based on the reference deviation amount of the sheet feeding cassette that the paper sheet has been stored.

5. The image forming apparatus according to claim 1, wherein the control unit saves sheet center actual position data that indicates sheet center actual positions detected of a predetermined number of latest print sheets; and
   the control unit (a) sets all initial values of the sheet center actual positions in the sheet center actual position data as the reference deviation amount, (b) renews one sheet center actual position in the sheet center actual position data with the sheet center actual position of each print sheet in continuous printing, and (c) sets an average of the predetermined number of the sheet center actual positions in the sheet center actual position data to the sheet center expectation position.

6. The image forming apparatus according to claim 5, wherein when the continuous printing is resumed after stopped, the control unit resets the sheet center actual positions in the sheet center actual position data to be the reference deviation amount.

* * * * *